United States Patent [19]

Upatnieks

[11] Patent Number: 5,151,800
[45] Date of Patent: Sep. 29, 1992

[54] COMPACT HOLOGRAM DISPLAYS & METHOD OF MAKING COMPACT HOLOGRAM

[75] Inventor: Juris Upatnieks, Ann Arbor, Mich.

[73] Assignee: Environmental Research Institute of Michigan, Ann Arbor, Mich.

[21] Appl. No.: 627,984

[22] Filed: Dec. 17, 1990

[51] Int. Cl.⁵ .............................................. G03H 1/22
[52] U.S. Cl. ...................................... 359/14; 359/30; 359/34; 359/572
[58] Field of Search .................. 359/1, 14, 30, 34, 567, 359/572

[56] References Cited

U.S. PATENT DOCUMENTS

| | | | |
|---|---|---|---|
| 3,680,943 | 8/1972 | Ogden et al. | 359/30 |
| 4,012,150 | 3/1977 | Upatnieks | 356/247 |
| 4,223,975 | 9/1980 | Upatnieks | 350/3.68 |
| 4,314,283 | 2/1982 | Kramer | 358/294 |
| 4,643,515 | 2/1987 | Upatnieks | 350/3.67 |
| 4,737,001 | 4/1988 | Moss | 359/34 |
| 5,035,473 | 6/1991 | Kuwayama et al. | 359/572 |

OTHER PUBLICATIONS

*Optical Society of America*, Apr. 7, 1970, p. 714, Paper entitled "Edge-Illuminated Hologram" by L. H. Lin.
*Practical holography* IV(1990), vol. 1212, Article entitled "Edge-Lit Rainbow Holograms" by Benton, Birner, & Shirakura.
*Applied Optics*, vol. 25, No. 22, Nov. 15, 1986, Article entitled "Display of Ordinary Transmission Holograms with a White Light Source" by Boj, Pardo, and Quintana.

*Primary Examiner*—Bruce Y. Arnold
*Assistant Examiner*—J. P. Ryan
*Attorney, Agent, or Firm*—Krass & Young

[57] ABSTRACT

A compact, self-contained monolith hologram display apparatus includes a laser diode mounted on an edge of a solid glass plate having a front surface with a hologram mounted thereon. The beam is expanded within the glass plate and is reflected off an opposing mirrored contoured edge surface that collimates the beam and directs it onto an angled reflection grating. The reflection grating is mounted onto an edge which is canted with respect to the front surface. The reflected beam diffracts from the grating and impinges upon the hologram to provide for reconstructed image that has achromatic properties.

24 Claims, 4 Drawing Sheets

COMPACT HOLOGRAM DISPLAYS & METHOD OF MAKING COMPACT HOLOGRAM

TECHNICAL FIELD

The present invention relates to an apparatus for achromatically displaying a hologram and more particularly to an apparatus for achromatically displaying holograms using edge illumination.

BACKGROUND OF THE INVENTION

Holograms for displaying visual information are being applied to an ever-widening range of fields including head-up displays, aiming sights, light collimators and light focusing apparatuses.

Previous methods of illuminating a hologram include illuminating the hologram from the rear surface thereof and transmitting the light through the hologram. This type of hologram is commonly referred to as a transmission hologram. The first transmission holograms transmit the reference beam on axis with the object beam. Later developments provide off axis transmission such that an observer views the image without directly looking into the reconstruction beam.

Reflection holograms have been developed which require a front light source. Even though reflection holograms eliminate the need for a light source behind the hologram thereby allowing a hologram to be mounted on a solid wall, much care has to be taken in choosing the appropriate light source angle so that the observer does not obstruct the light source and cast a shadow on the hologram. Furthermore the space in front of the hologram needs to be free of other obstacles that can cast interfering shadows.

Holograms, particularly glass plate holograms, can also be illuminated with an expanded laser beam that enters the side edge of the hologram cover plate. Side edge illuminated holograms are initially recorded with a reference beam entering the side edge of the hologram cover plate. One such side edge illumination system is disclosed in my U.S. Pat. No. 4,643,515 issued Feb. 17, 1987.

Expansion of the laser beams in ambient air has several disadvantages. Firstly, the space required to expand the beam renders the hologram display larger. The beam exiting a laser and travelling through air requires at least one lens, and several air-glass interfaces before the light enters the hologram edge. Each glass surface must be kept clean and free of moisture condensation in order to reconstruct the hologram. Keeping the hologram and each glass surface dry and dust free can be a serious problem in a holographic weapon sight application that is used in the field. Secondly, the laser used for expanding the laser beam in air is an electrically pumped gas or light pump solid laser that is large and often consumes more than 10 watts of input power at voltages of over 1,000 volts. The typical laser occupies space greater than 100,000 cubic millimeters.

Compact lasers such as laser diodes are known. The power consumption of a laser diode is often under 1 watt and operates with less than 5 volts. The volume of a laser diode is under a few cubic centimeters. Present laser diodes however emit a beam that has wavelength drift. The wavelength drift is undesirable for a clear accurate reconstruction of a hologram.

What is needed is a compact hologram display that is lightweight, has low power consumption, reduces exposed air-glass interfaces and sufficiently compensates for the wavelength drift of a compact laser diode. A system with the above advantages is also desired in an edge illuminated hologram display where the reference beam cannot be obstructed and the potential for shadows cast on the hologram is eliminated. Furthermore, a hologram display is desired that does not require extra space for the divergence of the laser beam.

SUMMARY OF THE INVENTION

In accordance with one aspect of the present invention, a hologram display includes a solid glass or plexiglass transparent unit having a planar front surface with a hologram thereon, a planar rear surface, and edge surfaces therebetween. A laser diode is mounted directly on a first edge surface between the front and rear surfaces. The laser diode has a laser light beam diverging in a non-circular fashion within the unit. A greater divergence angle lies in a plane parallel to the front surface and a narrower divergence angle lies in a plane perpendicular to the front surface. The laser diode directs its diverging beam to at least one other edge surface of the plate before the beam impinges on and illuminates the hologram at the front surface.

In one embodiment the diverging laser beam reflects off a second edge surface which opposes the first edge surface. The second edge surface can have a curved contour and a reflective coating thereon which reflects and collimates the laser beam and directs the beam to the front surface at the hologram. Preferably, the con d second edge surface reflects and directs the beam to an additional edge surface which is adjacent and to the rear of the first edge surface. The additional edge surface has a reflection grating thereon and is angled with respect to both the first edge surface and front surface. The beam reflecting from the reflection grating impinges upon the hologram front surface. The frequency of the reflection grating is typically higher than the carrier frequency of the hologram depending upon the angle between the additional edge surface and hologram plane such that the wavelength drift of the laser diode from its predetermined wavelength is compensated by the achromatism caused by the combination of the reflection grating and hologram.

In accordance with the broader aspect of the invention, the hologram display apparatus includes a holographic surface and a substantially planar grating. The holographic surface and grating are canted with respect to each other. The hologram has a carrier frequency that is lower than the grating frequency such that chromatic dispersion about a light wavelength emanating from the laser diode is minimized through the hologram.

In accordance with another broader aspect of the invention, an illuminating light source for producing a reconstructive light beam for illuminating a hologram is optically mounted to the first edge surface of a transparent unit having a substantially uniform index of refraction therein. The light source can be mounted via an optical fiber or directly mounted on a surface of the unit. Preferably the light source produces monochromatic light. A holographic surface on or in the transparent unit can be planar or contoured into an arc or other geometric design for viewing over greater angles. The hologram can be laminated such that a holographic photographic plate is mounted against one surface of the cover plate. The plates both have substantially identical indexes of refraction.

BRIEF DESCRIPTION OF THE DRAWINGS

Reference now is made to the accompanying drawings in which.

DETAILED DESCRIPTION OF THE PREFERRED EMBODIMENTS

Figures 1, 2, 3:
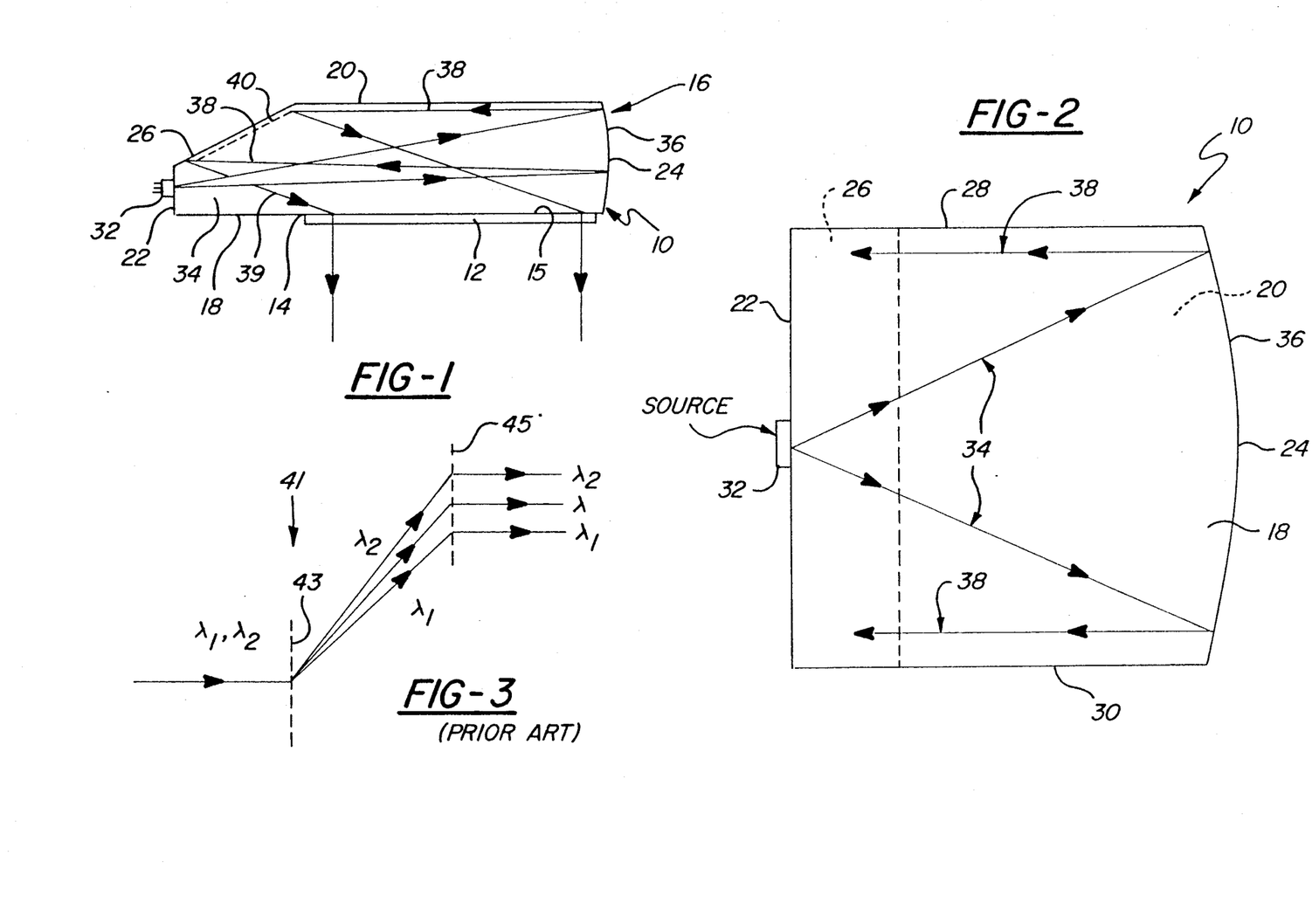
FIG. 1 is a top plan view of a hologram display according to one embodiment of the invention.
FIG. 2 is a front elevational view of the display shown in FIG. 1.
FIG. 3 schematically illustrates a prior art arrangement of a hologram and grating to form an achromatic system.

Reference is now made to FIG. 1 and FIG. 2 which illustrate a monolithic hologram display system 10. The system 10 includes a developed photographic planar plate 12 having a developed emulsion (i.e. hologram) 14 at its back side 15. The photographic plate 12 is mounted onto a planar front surface 18 of a solid glass cover plate 16. The plates 12 and 16 abut each other and have similar indexes of refraction. An optical cement is between the two plates 12 and 16 such that no air gap exists between the two plates. The optical cement has an index of refraction equal to or higher than the index of refraction for plate 16. The solid glass cover plate 16 has a planar rear surface 20 parallel to the front surface 18 and a plurality of side edge surfaces 22, 24, 26, 28 and 30 between the front surface 18 and rear surface 20.

A laser diode 32 is mounted directly on edge surface 22 such that the reconstructive light beam 34 from the laser diode is directed into glass plate 16 through edge surface 22. Laser diode 32 can be powered by batteries to achieve complete portability of the display system 10. The laser diode desirably has a volume of less than a few cubic millimeters. Its power consumption is usually less than 1 watt and has an operating voltage under 5 volts. The beam 34 that emanates from the laser diode diverges in a non-circular, elongated pattern such that the divergence shown in FIG. 2 parallel to the front surface 18 is substantially greater than the divergence transverse to the front surface 18 shown in FIG. 1. The ratios between the two rates of diverging can be as large as five to one.

The diverging beam 34 is reflected off of contoured edge surface 24. Edge surface 24 has a reflective coating 36 adhered thereto. The edge surface 24 is contoured in both the vertical direction as shown in FIG. 2 and the horizontal direction as shown in FIG. 1 to collimate the diverging beam 34 to form collimated beam leg 38.

Collimated beam leg 38 is directed parallel to front surface 20 toward edge surface 26 which is adjacent to the rear of edge surface 22. Furthermore, edge surface 26 is canted with respect to both the edge surface 22 and front surface 18. The edge surface 26 has a reflection grating 40 thereon which both reflects and diffracts the beam leg 38. The last leg 39 of beam 34 is directed to pass surface 18, through the optical cement and to the photographic plate 12 through the hologram 14 to reconstruct a virtual or real image. As shown in FIG. 1, the hologram is a transmission hologram that is observed from the plate glass 12 (viewed from below as shown in FIG. 1). However, the hologram can alternatively be a reflection hologram and can be viewed from the side with the glass plate 16 (viewed from above as shown in FIG. 1).

A conventional achromatic grating system 41 is illustrated in FIG. 3. A transmission grating 43 is parallel to a hologram 45. The frequency of the grating and the carrier frequency of the hologram are equal to produce achromaticity between two wavelengths $\lambda 1$ and $\lambda 2$ which are slightly longer and shorter respectively about a predetermined measured wavelength $\lambda$. The two different wavelengths $\lambda 1$ and $\lambda 2$ are both diffracted a different degree through the grating and then are diffracted through the hologram such that the exit angles of $\lambda 1$ and $\lambda 2$ are equal and therefore the chromatic dispersion is greatly reduced or eliminated between the two different wavelengths.

Several disadvantages with the conventional system as illustrated in FIG. 3 exist. Firstly, the grating must be spatially displaced from the hologram in both a longitudinal and lateral direction. The grating must be at least as large as the hologram. The grating, by being as large as the hologram and spaced behind the hologram, must be laterally displaced a significant amount from the hologram. Consequently, a relatively large display apparatus is needed.

Figure 4:
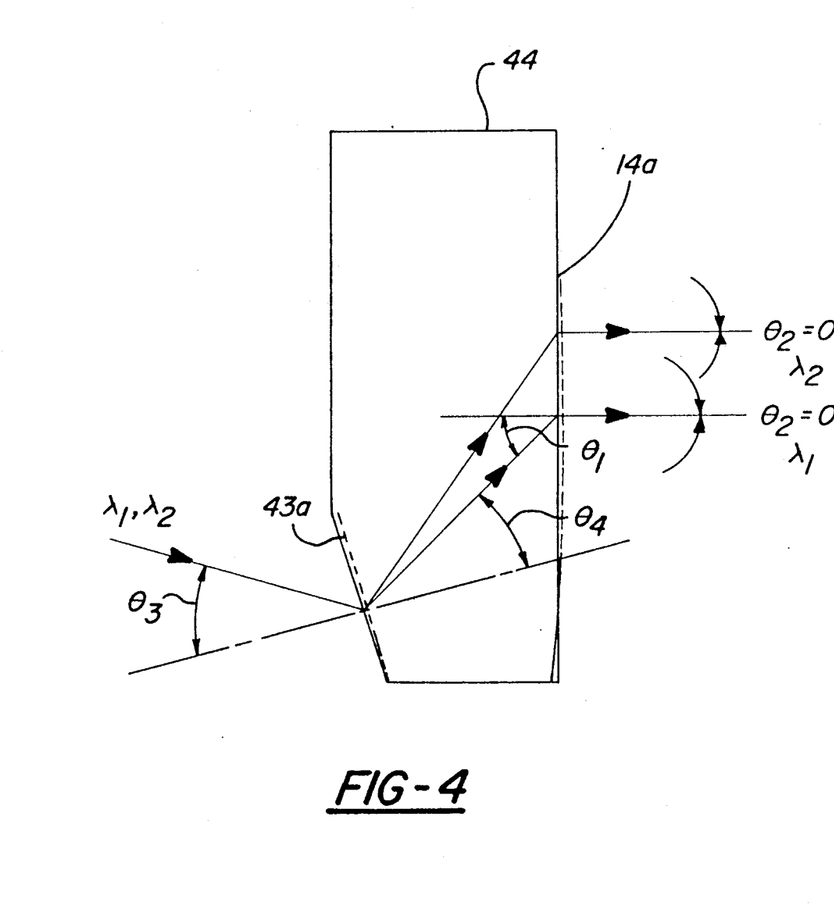
FIG. 4 illustrates an alternate embodiment according to the invention incorporating an angled transmission grating.

An alternate arrangement 44 shown in FIG. 4 illustrates the angles of incidence and diffraction of the light beam with the transmission grating 43a and the hologram transmission 14a. In this embodiment, the grating plane is canted with respect to the plane of the hologram 4a. The relationship is as follows:

$$\lambda f_1 = \sin \theta_2 + \sin \theta_1 \quad (1)$$

where $f_1$ is the carrier frequency of the hologram, $\lambda$ is the wavelength of the light beam, $\theta_1$ is the angle incidence, and $\theta_2$ is the angle of diffraction (i.e. exit angle). We can find the rate of change of angle $\theta_1$ with respect to change in $\lambda$ by differentiating and solving for $d\theta_1/d\lambda$ as follows:

$$\frac{d\theta_1}{d\lambda} = \frac{f_1}{\cos\theta_1} = \frac{\sin\theta_1 + \sin\theta_2}{\lambda_0 \cos\theta_1} \quad (2)$$

where $\lambda$ is the center wavelength of the light beam. Letting $\theta_2$ approximately equal 0 then:

$$\frac{d\theta_1}{d\lambda} = \frac{1}{\lambda_0} \tan\theta_1 \quad (3)$$

For the grating in FIG. 4 we obtain the equation:

$$\lambda f_2 = \sin \theta_3 + \sin \theta_4 \quad (4)$$

where $f_2$ is the frequency of the transmission grating 43a, $\theta_3$ is the angle of incidence on grating 43a, and $\theta_4$ is the angle of diffraction from the grating 43a. We assume the incident light at angle $\theta_3$ constant. Differentiating and solving for $d\theta_4/d\lambda$ we obtain:

$$\frac{d\theta_4}{d\lambda} = \frac{f_2}{\cos\theta_4} = \frac{\sin\theta_3 + \sin\theta_4}{\lambda_0 \cos\theta_4} \quad (5)$$

One can now set $\theta_3 = \theta_4$ where the angle of incidence equals the angle of diffraction. One then obtains:

$$\frac{d\theta_4}{d\lambda} = \frac{2}{\lambda_0} \frac{\sin\theta_4}{\cos\theta_4} = \frac{2}{\lambda_0} \tan\theta_4 \quad (6)$$

To be achromatic, the light illuminating hologram 14a and emanating from grating 43a must have its dispersion equal, in other words, the angular changes as a function of $\lambda$ must be equal. Thus, the following condition is needed:

$$\frac{d\theta_4}{d\lambda} = \frac{d\theta_1}{d\lambda} \quad (7)$$

which as shown above is:

$$\frac{1}{\lambda_0} \tan\theta_1 = \frac{2}{\lambda_0} \tan\theta_4 \quad (8)$$

or $$\theta_4 = \tan^{-1}\left[\frac{1}{2} \tan\theta_1\right] \quad (9)$$

Upon finding the appropriate angles $\theta_4$ and $\theta_1$ based on $\lambda$, $f_1$, and $f_2$, one can see by simple geometry that the transmission grating 43a can be shorter than the hologram 14a.

Figure 5:
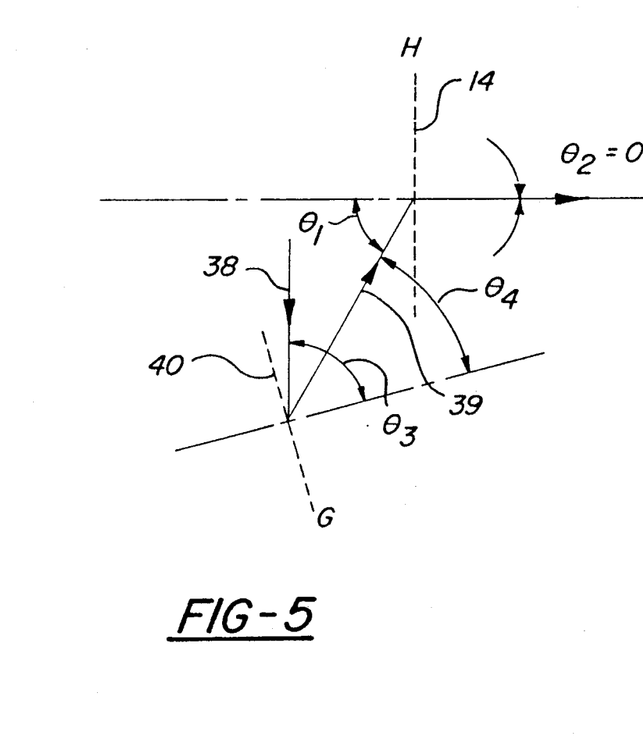
FIG. 5 is a schematic view illustrating the angles of incidence and refraction for the embodiment shown in FIG. 1.

A further reduction of space for displaying the hologram can be achieved if the transmission grating 43a is replaced by the aforementioned reflection grating 40. However, for a reflection grating 40, if $\theta_3 = \theta_4$ then angles $\theta_3$ and $\theta_4$ would coincide which is an impractical arrangement. If $\theta_3$ is increased with respect to $\theta_4$, we are able to obtain an incident ray which is approximately parallel to the hologram 14 as shown in FIG. 5. $\theta_4$ is chosen to match the required incident angle $\theta_1$ of the hologram at $\lambda_0$. The tilt of angle of the grating 40 is selected to satisfy Equation 7 for the geometry where the incident beam leg 38 is substantially parallel to hologram 14. The following four equations must be satisfied.

$$\theta_3 - \theta_4 = 90° - \theta_1 \quad (10)$$

$$\lambda_0 f_1 = \sin \theta_1 \quad (11)$$

$$\lambda_0 f_2 = \sin \theta_3 + \sin \theta_4 \quad (4)$$

and $$\frac{d\theta_4}{d\lambda} = \frac{d\theta_1}{d\lambda} \quad (7)$$

The derivatives in Equation (7) are substituted by terms in Equation 3 and Equation 5, to obtain:

$$\frac{\sin\theta_3 - \sin\theta_4}{\cos\theta_4} = \tan\theta_1 \quad (12)$$

Equation 12 has $\theta_3$ substituted by terms found in Equation 10 to obtain:

$$\tan\theta_4 = \frac{\tan\theta_1 - \cos\theta_1}{1 + \sin\theta_1} \quad (13)$$

A desired $\theta_1$ is selected and the required angle $\theta_4$ is thus calculated.

The achromatization of the hologram 14 when used for a range finder and aim sight can reduce aiming error by a factor of up to 45 times compared to a hologram with When $\tan\theta_1 = 10$, the aiming error can be reduced by a factor of 10 times. These numbers are based on $\lambda_0 = 633$ nm.

Figure 6:
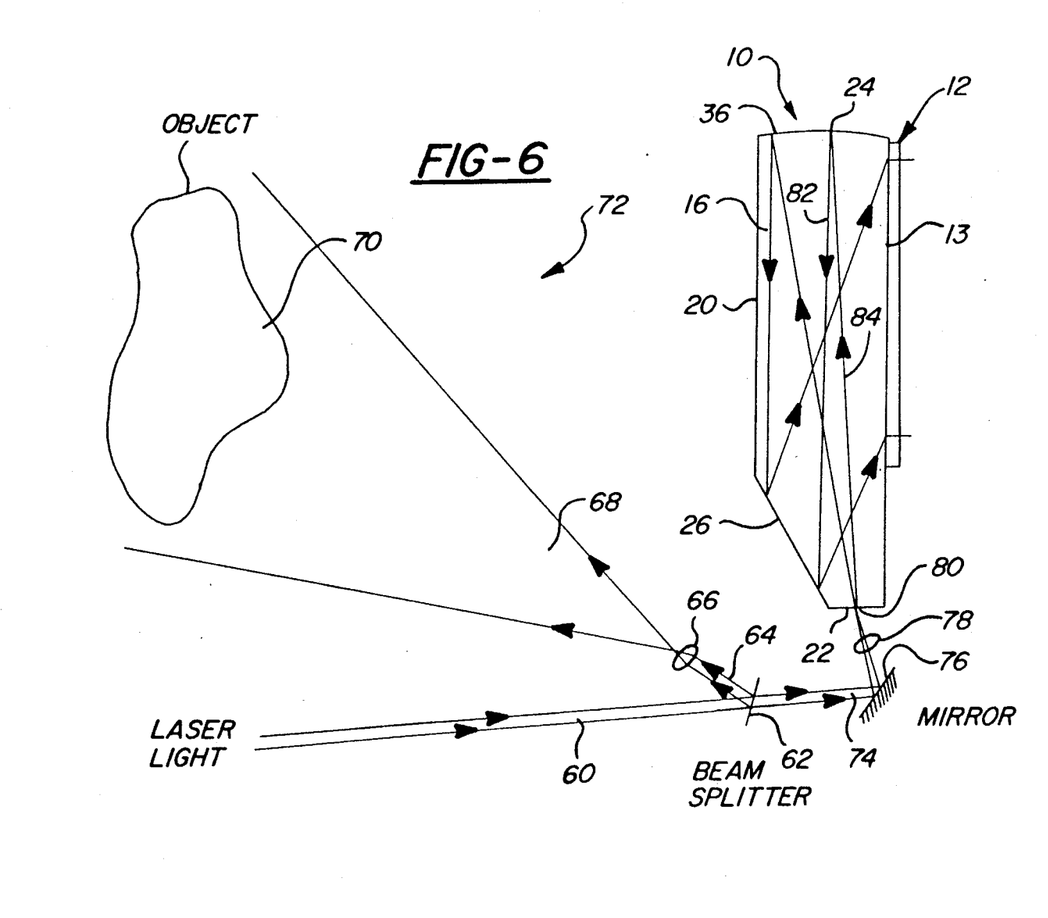
FIG. 6 is a schematic view illustrating the recording system for the hologram in FIG. 1.

Referring now to FIG. 6, the hologram of FIG. 1 is produced by a laser light beam 60 aimed toward a beam splitter 62 which splits beam 60 into two beams 64 and 74. Beam 64 passes through a lens 66 to produce a diverging beam leg 68 which impinges on an object 70. An object wavefront 72 reflects off object 70 situated to the left of the hologram assembly 10. The wavefront 72 is then directed through the glass plate 16 to impinge upon an emulsion layer 13. The second beam 74 is reflected off mirror 76 and through a focusing lens 78 which focuses the beam at point 80 at the edge surface 22. The lens 78 can be astigmatic to achieve a proper beam spread within the glass plate in the vertical and horizontal directions. The beam 74 is reflected off mirrored coating 36 on contoured edge 24 to produce the collimated beam leg 82 which in turn is reflected off of reflection grating 26 such that a reference wavefront 84 is directed onto the emulsion 13. An optical coupling liquid is interposed between the plates 12 and 16 to fill up the space therebetween. The liquid has an index of refraction equal to or slightly higher than the glass plates 12 and 16. If a reflection hologram is being produced, the object 70 will be placed to the right of plate 12 and the beams 64 and 68 are similarly directed to the right to impinge on object 70 to form an object wavefront 72 impinging on plate 12 from the right.

After the proper exposure to wavefronts 72 and 84, the hologram plate 12 is taken off plate 16 and the emulsion 13 is then processed to form hologram 14. The processed plate 12 is remounted on plate 16 with optical cement for display of the hologram. The path of the reference beam 74 within the glass plate 16 shown in FIG. 6 is duplicated by the path of beam 34 when it reconstructs the image of the object 70 shown in FIG. 1.

Figure 7:
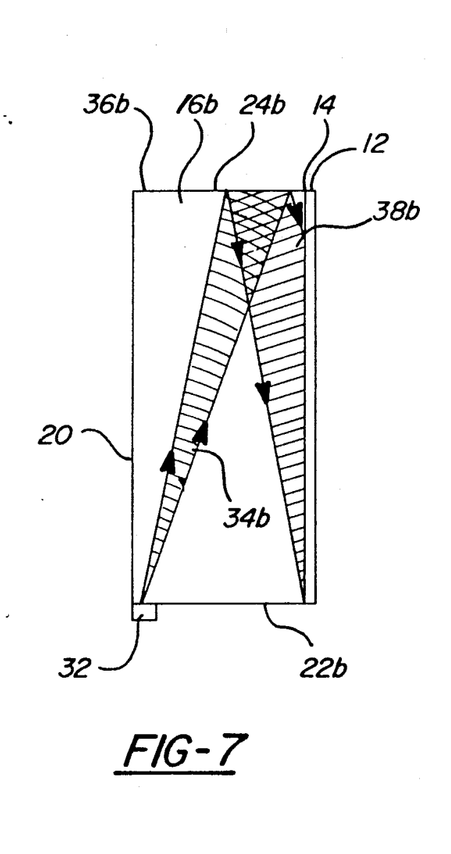
FIG. 7 illustrates an alternate hologram display using edge illumination and internal beam expansion.

Other geometries are possible for a monolithic edge illuminated hologram display system. As shown in FIG. 7, laser diode 32 is mounted on side edge surface 22b near the rear surface 20 of glass plate 16b. The opposing side edge surface 24b has a reflective coating 36b. The edge surface 24b is flat so that the beam 34b continues to diverge along its leg 38b after reflection off of edge surface 24b until it impinges hologram 14. For certain applications, this simplified geometric arrangement is adequate with the diverging beam 38 impinging upon hologram 14.

Figure 8:
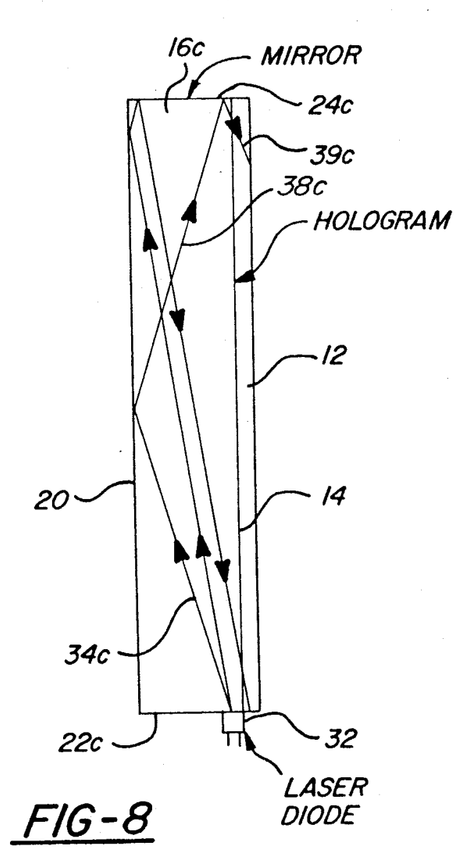
FIG. 8 illustrates an alternate hologram display using multiple internal reflections.

Referring now to FIG. 8, an alternate arrangement is shown in which the laser diode 32 is mounted near a front portion of edge surface 22c adjacent the hologram 14. The diode 32 has a beam 32c arranged such that it is internally reflected off the back surface 20 of the plate 16c. The angle of incidence of beam surface 20 is sufficiently great to satisfy Snell's equation for complete internal reflection. Therefore, total internal reflection occurs without the need for a reflective coating on back surface 20. Edge surface 24c has a reflective coating thereon. Edge surface 24c is flat, such that the leg 39c of beam 34 continues to diverge after reflection off edge surface 24c until it impinges upon the hologram 14.

Figure 9:
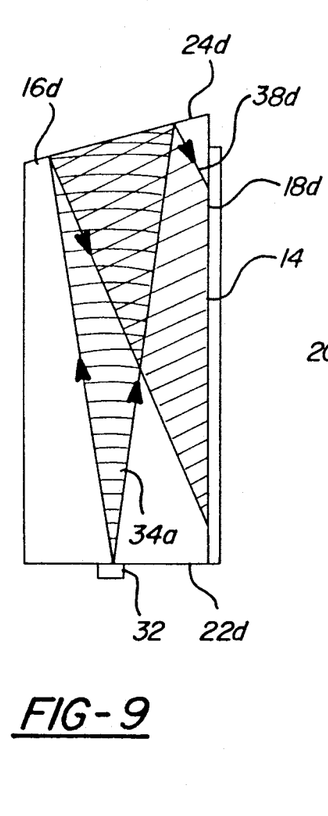
FIG. 9 illustrates an alternate display using an angles reflective edge surface to reflect the beam directly to the hologram.

Another embodiment illustrated in FIG. 9 discloses a laser diode 32 mounted at the center of the edge 22d. The opposing edge surface 24d is angled such that it directs diverging beam leg 38d toward the hologram 14 at the front surface 18d.

Figure 10:
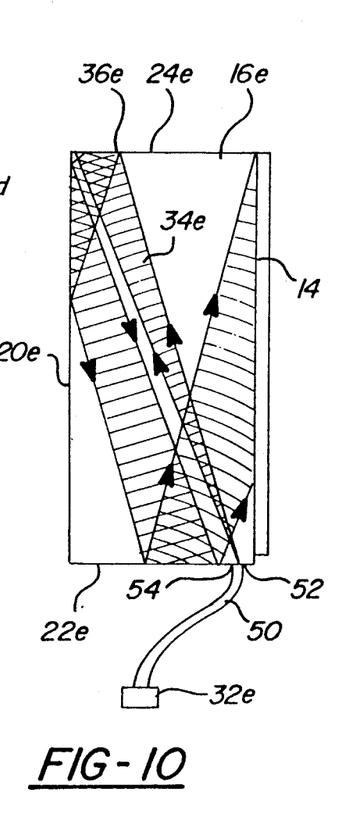
FIG. 10 illustrates an alternate display of a laser diode coupled to the hologram via optical fiber.

FIG. 10 discloses an arrangement and geometry which provides for longer beam travel within the glass plate. The laser diode 32e is remotely positioned from the edge surface 22e and is optically coupled thereto by an optical fiber 50 mounted at entrance point 52. The entrance point 52 is located near the front surface 18e. The beam 34e diverges from the entrance point 52 and is aimed directly at edge surface 24e at an angle toward the rear surface 20e. The beam is reflected by reflective coating 36e on edge surface 24e onto the rear surface 20e. Total internal reflection off of rear surface 20e then redirects the beam back toward edge surface 22e. Edge surface 22e has a reflective coating thereon except for a transparent window 54 at the entrance point 52. The incident beam is then reflected off of edge surface 22e and directed toward hologram 14. In this geometry, the beam is reflected off of three surfaces within the glass plate before it impinges on hologram 14. The beam 34e also travels farther, thus its diverging angle is smaller than the one shown in FIG. 9.

Figure 11:
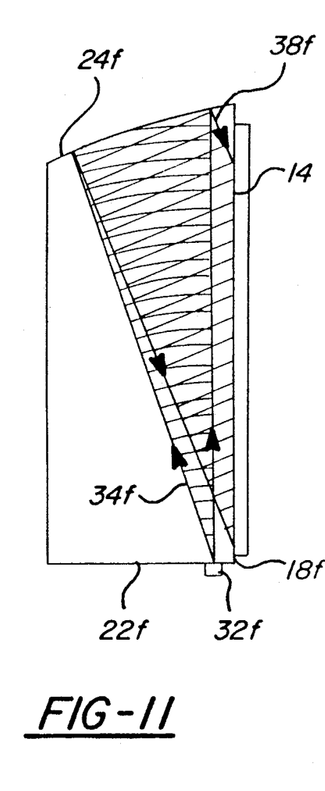
FIG. 11 discloses an alternate hologram display having an opposing edge surface collimating the beam and reflecting the beam toward the hologram.

FIG. 11 discloses an arrangement which has the laser diode 32f mounted on side edge surface 22f near the front surface 18f. The beam 34f is directed to edge surface 24f. Edge 24f is both angled and contoured such that the beam leg 38f is both collimated and directed toward the hologram 14 as it reflects off of edge surface 24f.

Depending upon the desired geometric configuration of the alternate holograms, as depicted in FIGS. 7–11, the arrangement of the hologram recording system as illustrated in FIG. 6 is modified such that reference beam 74 is reflected off mirror 76 and through lens 78 to focus on the side edge surface 22 and pass into and diverge in the hologram assembly to duplicate the same path as illustrated in FIGS. 7–11.

In this fashion, depending upon the need for chromatic correction and precision of a collimated beam onto the hologram 14, various geometries are available for a compact monolith hologram display in which the beam emanates from a side edge surface of the glass plate and is expanded within the glass plate before it impinges upon the hologram on the front surface of the glass plate. Furthermore, if chromatic correction is required, a diffraction grating can be mounted on a canted edge of the glass plate 16 to reflect a beam that has been expanded within the glass plate. Furthermore, if a collimated beam is required, one of the edges can be contoured and surfaced with a reflective material to both reflect and collimate the expanded beam. The contoured shaped reflective surface can be substituted with a holographic diffraction reflection grating to form a collimated beam.

Furthermore, other geometries can include the front surface 20 of the hologram being contoured to provide wider viewing angles of the hologram.

The emulsion 13 and derived processed hologram 14 can also be applied or coated directly on plate 16 thereby eliminating photographic plate 12.

Other variations and modifications of the present invention are possible without departing from its scope and spirit as defined by the appended claims.

The embodiments of the invention in which an exclusive property or privilege as claimed are defined as follows:

1. A hologram display apparatus characterized by:
    a transparent plate with a pair of opposing surfaces and edge surfaces therebetween;
    one of said opposing surfaces having a hologram thereagainst;
    an illuminating light source for producing a light beam for illuminating said hologram; and
    said illuminating light source being optically mounted on one of said edge surfaces of said transparent plate such that expansion of said light beam from said source occurs within said transparent plate, and said illuminating light source further directing said light beam to reflect against at least one surface of said transparent plate before illuminating said hologram at said one of said opposing surface.

2. A hologram display apparatus as defined in claim 1, further characterized by:
    said at least one surface being a reflective edge surface;
    said reflective edge surface having optical collimating means for collimating a diverging light beam from said illuminating light source.

3. A hologram display apparatus as defined in claim 2 further characterized by:
    said reflective edge surface opposing said first edge surface having a reflective coating thereon;
    said opposing reflective edge surface being contoured and angled to collimate and direct a light beam to said one of said opposing surfaces.

4. A hologram display apparatus as defined in claim 2 further characterized by:
    a reflection grating on another of said edge surfaces to receive said collimated beam from said reflective edge surface to reflect said collimated beam onto said hologram on said one of said opposing surfaces for achromaticity of said hologram approximately at a predetermined wavelength of light.

5. A hologram display apparatus as defined in claim 4 further characterized by:
    said reflection grating being canted with respect to said one of said opposing surfaces.

6. A hologram display apparatus as defined in claim 1, further characterized by:
    said illuminating light source being a diode laser.

7. A hologram display apparatus as defined in claim 6 further characterized by:
    said at least one surface being reflective and contoured to collimate a diverging light beam from said diode laser.

8. A hologram as defined in claim 7 further characterized by:
    said at least one surface being one of said edge surfaces.

9. A hologram display apparatus as defined in claim 6 further characterized by:

said at least one surface having a holographic diffraction reflection grating to collimate a diverging light beam from said diode laser.

10. A hologram as defined in claim 9 further characterized by:
said at least one surface being one of said edge surfaces.

11. A hologram display apparatus as defined in claim 6 further characterized by:
said diode laser being mounted directly on said one of the edge surfaces.

12. A hologram display apparatus as defined in claim 1 further characterized by:
said light beam directed to internally reflect off said rear surface and to reflect off a reflective opposing edge surface that opposes said one of said edge surfaces.

13. A hologram display apparatus as defined in claim 12 further characterized by:
said light beam being reflected from said reflective opposing edge surface and directed to said first edge surface to which said light source is optically mounted, said one of said edge surfaces having a reflective coating thereon with a window to let in said light beam from said light source.

14. A hologram display apparatus characterized by:
a substantially planar transparent plate having first and second major surfaces that are parallel to each other, and side edge surfaces between said first and second major surfaces, said side edge surfaces including a canted side edge surface neither parallel nor perpendicular to either said first or second major surface;
a substantially planar hologram disposed on said first major surface of said transparent plate;
a substantially planar diffraction grating disposed on said canted side edge surface of said transparent plate;
said hologram having a carrier frequency and said diffraction grating having a different frequency selected with regard to a predetermined wavelength of light for causing light diffracted by said diffraction grating and by said hologram to be achromatized about said predetermined wavelength of light.

15. A hologram display apparatus as defined in claim 14 further characterized by:
said diffraction grating being a reflective diffraction grating.

16. A hologram display device as defined in claim 15 further characterized by:
a light collimator being mounted on a side edge of said transparent plate opposing said canted side edge surface with said reflective diffraction grating.

17. A hologram display apparatus characterized by:
a solid transparent unit having first and second distinct and spaced surfaces;
a hologram mounted on said first surface of said solid transparent unit;
a reflective diffraction grating being mounted on said second surface of said solid transparent unit, said second surface of said solid transparent unit disposed at an angle with respect to said first surface of said solid transparent unit whereby said reflective diffraction grating receives a reconstructing light beam that passes by said hologram and substantially parallel thereto to reflect and diffract said light beam so that it impinges onto said hologram; and
said hologram diffracts said light beam from said reflective diffraction grating such that the final direction of said light beam near a predetermined center wavelength is independent of the wavelength of said beam.

18. A hologram display apparatus characterized by:
a solid transparent member with first and second opposing surfaces and edge surfaces therebetween;
a hologram on the first of said opposing surface of said plate;
a substantially monochromatic light source for producing a reconstructive light beam for illuminating said hologram;
said monochromatic light source optically mounted on one of said edge surfaces of said member such that expansion of said light beam from said light source occurs within said member with said dispersion being substantially greater along an axis parallel with said first opposing surface and less along an axis perpendicular to said first opposing surface;
a second of said edge surfaces of said plate opposing said one of said edge surfaces and having a reflective light collimator thereon to reflect and collimate said dispersing light beam from said one of said edge surfaces and directing the collimated beam of light behind and substantially parallel to said first opposing surface;
a third of said edge surfaces adjacent to and canted at an angle with respect to said first opposing surface and said one of said edge surfaces;
said third of said edge surfaces having a reflective grating to reflect said collimated beam and direct it to impinge on said hologram; and
said reflective grating having a frequency different from the carrier frequency of the hologram and angled with respect to the hologram such that achromaticity about a predetermined wavelength of light from said light source is provided.

19. A hologram display apparatus as defined in claim 18 further characterized by:
said substantially monochromatic light source being a laser diode.

20. A hologram display apparatus as defined in claim 19 further characterized by:
said laser diode being mounted directly on said first edge surface.

21. A method of recording a hologram comprising;
placing a recording medium sensitive to electromagnetic energy adjacent a front surface of a transparent body having said front surface, a rear surface, and edge surfaces therebetween;
forming a first and second beam from a coherent source of electromagnetic energy;
expanding said first beam;
creating an object wavefront by illuminating an object to be holographically recorded with said expanded first beam;
directing a portion of said object wavefront to impinge on said recording medium;
creating a reference wavefront by directing and focusing said second beam approximately at one of said edge surfaces;
diverging said second beam within said transparent body;

reflecting said expanded second beam off of one of said surfaces of said transparent body to form said reference wavefront; and directing said reference wavefront to impinge on said recording medium and creating an electromagnetic interference pattern with said object wavefront;

rendering said interference pattern permanent in said recording medium.

22. A hologram display apparatus comprising:

a transparent member having a substantially uniform index of refraction therein;

a hologram disposed on a first surface of said transparent member;

a reflective diffraction grating disposed on a second surface of said transparent member;

a light source for illuminating said hologram with a reconstructive light beam that expands within said transparent member, reflects and diffracts from said reflective diffraction grating to impinge on said hologram to form a holographic image.

23. A hologram display as defined in claim 22 further characterized by:

said transparent member having a reflective surface for reflecting said reconstruction beam therein.

24. A hologram display apparatus as defined in claim 22 further characterized by:

said light source being mounted to said transparent member.

* * * * *